Patented Sept. 12, 1944

2,357,958

UNITED STATES PATENT OFFICE 2,357,958

MONOAZO RED ACID DYES

Arthur Howard Knight, Blackley, Manchester, England, assignor to Imperial Chemical Industries Limited, a corporation of Great Britain No Drawing. Application March 2, 1942, Serial No. 433,095. In Great Britain March 21, 1941

6 Claims. (Cl. 260—199)

This invention relates to the manufacture and application of my new monoazo red acid dyes suitable for colouring animal fibres, for example wool and silk.

We manufacture the dyes by combining a diazotised 1-N-(benzoyl)-cyclohexyl- or -methylcyclohexyl-amino-4-amino-benzene with a 1-N-benzoylamino-8-naphthol-3:6- or -4:6- disulphonic acid, the said diazo and coupling components being such that the benzoyl groups each contain at least one nuclear chloro or bromo substituent.

As particular diazo components there may be mentioned 1-N-benzoyl-cyclohexylamino-4-aminobenzene having 2'-, 3'-, 4'-chloro- and bromo-, 2':5'-dichloro- and 2'-chloro-5'-bromo-substituents, as well as 1-N-benzoyl- and 1-N-2'-chlorobenzoyl-p-methylcyclohexylamino-4-amino-benzenes. Further, as particular coupling components there may be mentioned 1-benzoylamino-8-naphthol- 5:6- and -4:6-disulphonic acids having 2'-, 3'-, 4'-chloro- and -bromo-, 2':4'- and 2':5'-dichloro-, 2'-chloro-5'-bromo- and 3'-chloro-4'-bromo- substituents. The diazo and coupling components must be chosen so that each of the benzoyl radicals carries a chloro or bromo substituent. As will be seen from the particular components listed above, the dystuffs may be such as have 2, 3 or 4 chloro or bromo substituents in the benzoyl radicals. It is usually unnecessary to have more than 4 halogen substituents, as dyes of the necessary fastness are obtained without having more than 4 halogen substituents and also the necessary diazo component or coupling component or both must then contain at least 3 halogen substituents and components containing as many substituents as this may be difficult or inconvenient to prepare. When bromine substituents are present, frequently not more than one bromine substituent is necessary. The use of derivatives of K acid tends to give greater brightness and yellower shades as compared with the use of corresponding H acid derivatives.

The dyes are soluble in water and dye wool from an acid or neutral dyebath in various shades of red, the dyeings having very good fastness to severe washing, milling, perspiration and sulphur stoving, and good fastness to light. They also dye silk and other animal fibres.

The diazo components employed according to the invention can be obtained by reacting the appropriate 4-nitrocyclohexylaniline with the appropriate benzoyl halide (e. g. the chloride) in dry toluene at the boil to give the corresponding 1-N-(benzoyl)-cyclohexlamino-4-nitrobenzene which can be reduced to the corresponding 1-N-(benzoyl)-cyclohexylamino-4-aminobenzene by iron and hydrochloric acid, for example in boiling ethyl alcoholic solution.

The coupling components employed according to the invention can be obtained by reacting an aqueous solution of one molecular proportion of the neutral sodium or potassium salt of the appropriate 1:8-aminonaphtholdisulphonic acid with rather more than one molecular proportion of the appropriate benzoyl halide (e. g. the chloride) in the presence of an acid binding agent (e. g. sodium acetate) at room temperature or at temperatures up to about 55° C. (according to the particular acid halide being employed) until no diazotisable amino group can be detected. The reaction product is neutralised (e. g. with sodium or potassium carbonate) and then the resulting liquor can be used as such or the coupling component can be isolated as the disodium or dipotassium salt by salting-out with sodium or potassium chloride.

Specification No. 340,460 claims a process for the manufacture of azo dyestuffs for wool by combining a diazo compound of an N-acyl-cyclohexyl-amino-arylamine or of a substitution product thereof with an azo component containing a sulphonic and/or carboxylic acid group.

The dyestuffs of the present invention are superior to the red dyestuffs known from the said specification in fastness to severe washing and milling.

The invention is illustrated, but not limited, by the following examples, in which the parts are by weight.

Example 1

36.3 parts of 1-N-(2':5'-dichlorobenzoyl)-cyclohexyl-amino-4-aminobenzene are dissolved in 85 parts of warm glacial acetic acid. To this 25 parts of 36% hydrochloric acid diluted with 80 parts of water are added and the resulting solution further diluted with 80–100 parts of water. A solution of 7.0 parts of sodium nitrite in 50 parts of water is then added, the temperature of the mixture being 30–35° C.

The solution of the diazo compound so-obtained is filtered if necessary, cooled to 5–10° C. and added to a solution of 51.5 parts of the disodium salt of 1-(2'-chlorobenzoyl)-amino-8-naphthol-4:6-disulphonic acid in 1000 parts of water kept alkaline by means of sodium carbonate.

The dye so-obtained is salted out if necessary, filtered off, and dried.

It dyes wool from an acid bath in bright red shades of very good fastness to severe washing, milling, sulphur stoving and perspiration, and good fastness to light.

If instead of 51.5 parts of the disodium salt of 1-(2'-chlorobenzoyl)-amino-8-naphthol-4:6- disulphonic acid there is used the same amount of the disodium salt of 1-(2'-chlorobenzoyl)-amino-8-naphthol-3:6-disulphonic acid or 55 parts of the disodium salt of 1-(2':5'-dichlorobenzoyl)- amino-8-naphthol-3:6-disulphonic acid, dyestuffs are obtained which yield on wool bluer shades of red having similar fastness properties.

Example 2

36.3 parts of 1-N-(2':5'-dichlorobenzoyl)-cyclohexylamino-4-aminobenzene are dissolved in 85 parts of warm glacial acetic acid. 25 parts of 36% hydrochloric acid diluted with 80 parts of water are then added and the resulting solution further diluted with 80-100 parts of water. A solution of 7.0 parts of sodium nitrite in 50 parts of water is then added, the temperature of the mixture being 30-35° C.

The solution of the diazo compound so obtained is filtered if necessary and cooled to 5-10° C. It is then added gradually to a cooled solution of 55 parts of the disodium salt of 1-(2':5'-dichlorobenzoyl)-amino-8-naphthol-4:6 - disulphonic acid in 1000 parts of water, the coupling liquor being kept alkaline during the addition by means of sodium carbonate. Coupling is rapid and, when it is complete, the new dyestuff is filtered off and dried.

Example 3

36.3 parts of 1-N-(2':5'-dichlorobenzoyl)-cyclohexylamino-4-aminobenzene are diazotised as in Example 1. The solution of the diazo compound, cooled to 5-10° C., is added to a solution of 51.5 parts of the disodium salt of 1-(3'-chlorobenzoyl)-amino-8-naphthol-4:6-disulphonic acid in 1000 parts of water kept alkaline to litmus by means of sodium carbonate. The new dyestuff so obtained is isolated in the usual way and, if necessary, can be further purified by solution in hot water, filtration of the resulting solution from any insoluble matter, and re-precipitation of the dyestuff by addition of common salt, followed by filtration and drying. It dyes wool from an acid dyebath or from a dyebath containing ammonium acetate in bright red shades of very good fastness to severe washing, milling, sulphur stoving, and perspiration, and good fastness to light.

If instead of 51.5 parts of the disodium salt of 1-(3'-chlorobenzoyl)-amino-8 -naphthol-4:6-disulphonic acid there are used 48.1 parts of the disodium salt of 1-benzoyl-amino-8-naphthol-4:6-disulphonic acid, a dyestuff is obtained which dyes wool from an acid or neutral dyebath in somewhat yellower shades of red.

The corresponding dyestuff from 56 parts of the disodium salt of 1-(3'-bromobenzoyl)-amino-8-naphthol-4:6-disulphonic acid yields bluer shades of red on wool, the dyeings having similar fastness properties.

Example 4

32.85 parts of 1-N-(3'-chlorobenzoyl)-cyclohexylamino-4-aminobenzene (M. P. 160-162° C.) are dissolved in 400 parts of hot water containing 25 parts of 36% hydrochloric acid and the solution cooled to 15-20° C. A solution of 7 parts of sodium nitrite in 50 parts of water is then added. The suspension of the diazo compound so obtained is cooled to 5-7° C. and added to a similarly cooled solution of 56 parts of the disodium salt of 1-(3'-bromobenzoyl)-amino-8-naphthol-3:6-disulphonic acid in 800 parts of water to which 21 parts of anhydrous sodium carbonate have been added. The new dyestuff so-obtained is filtered off and dried. It dyes wool from an acid or neutral dyebath in very bluish-red shades, the dyeings having very good fastness to severe washing, milling, perspiration and sulphur stoving, and good fastness to light.

The corresponding dyestuff from 56 parts of the disodium salt of 1-(4'-bromobenzoyl)-amino-8-naphthol-3:6-disulphonic acid yields still bluer shades of red on wool.

Example 5

37.3 parts of 1-N-(3'-bromobenzoyl)-cyclohexylamino-4-aminobenzene (M. P. 150° C.) are diazotised by the method of Example 2. The solution of the diazo compound so-obtained is filtered if necessary and cooled to 5-10° C. It is then gradually added to a cooled solution of 56 parts of the disodium salt of 1-(3'-bromobenzoyl)-amino-8-naphthol-3:6-disulphonic acid in 800 parts of water containing 50 parts of common salt, the coupling liquor being kept alkaline during the addition by means of sodium carbonate. Coupling is rapid and, when it is complete, the new dyestuff is filtered off and dried.

It dyes wool from an acid or neutral dyebath in very bluish-red shades, the dyeings having very good fastness to severe washing, milling, perspiration and sulphur stoving, and good light fastness.

If in the above recipe 37.3 parts of 1-(4'-bromobenzoyl) - cyclohexylamino - 4 - aminobenzene (M. P. 176° C.) are used instead of the 37.3 parts of 1-(3'-bromobenzoyl)-cyclohexylamino-4-aminobenzene, a dyestuff is obtained which dyes wool in similar shades, the dyeings having similar fastness properties.

The corresponding dyestuff from 37.3 parts of 1-(4'-bromobenzoyl)-cyclohexylamino-4 - aminobenzene and 56 parts of the disodium salt of 1-(3'-bromobenzoyl)-amino-8-naphthol-4:6- disulphonic acid gives on wool a much yellower shade of red, the dyeings having similar good fastness properties.

Example 6

32.85 parts of 1-N-(2'-chlorobenzoyl)-cyclohexylamino-4-aminobenzene (M. P. 225-227° C.) are diazotised and the diazo compound coupled with 55 parts of the disodium salt of 1-(2':5'-dichlorobenzoyl)-amino-8- naphthol - 3:6 - disulphonic acid by the method of Example 2. The dyestuff obtained is filtered off and purified if necessary by dissolving it in 2000 parts of water at 80° C. filtering, and precipitating the dyestuff from the cooled filtrate with common salt. It is then filtered off and dried. It dyes wool from a neutral or acid dyebath in bluish-red shades, the dyeings having very good fastness to severe washing, milling, perspiration and sulphur stoving and good fastness to light.

The corresponding dyestuff from 63.9 parts of the disodium salt of 1-(2':5'-dibromobenzoyl)-amino-8-naphthol-3:6-disulphonic acid gives bluish-red shades on wool of similar fastness properties.

Example 7

37.3 parts of 1-(4'-bromobenzoyl)-cyclohexylamino-4-aminobenzene are diazotised by the method of Example 2.

The filtered diazo solution is cooled to 5-7° C. and gradually added to a cooled solution of 55 parts of the disodium salt of 1-(2':5'-dichlorobenzoyl)-amino-8-naphthol-3:6-disulphonic acid in 800 parts of water to which 80 parts of common salt have been added, the coupling medium being kept alkaline to litmus during the addition by means of sodium carbonate. When coupling is complete the dyestuff suspension is heated to 80° C., filtered, and the dyestuff dried. It yields bluish-red shades on wool from an acid or neutral dyebath, the dyeings having very good fastness to severe washing, milling, perspiration and sulphur stoving, and good fastness to light.

*Example 8*

37.3 parts of 1-N-(3'-bromobenzoyl)-cyclohexylamino-4-aminobenzene are diazotised by the method of Example 2. The solution of the diazo compound so-obtained is filtered if necessary, and, after cooling to 5–10° C., is added gradually to a cooled solution of 51.5 parts of the disodium salt of 1-(3'-chlorobenzoyl)-amino-8-naphthol-4:6-disulphonic acid in 800 parts of water containing 50 parts of common salt, the coupling medium being kept alkaline to litmus during the addition by means of sodium carbonate. Coupling is rapid and, when it is complete, the dyestuff suspension is heated to 70–75° C., 50 parts of common salt added, and, after stirring a short time, the dyestuff filtered off.

If necessary the dyestuff can be purified by dissolving it in 2500 parts of water, filtering the solution from any insoluble matter, and precipitating the dyestuff at 80° C. by addition of about 100 parts of common salt. It is then filtered off and dried. It dyes wool from an acid or neutral dyebath in clear bluish-red shades, the dyeings having very good fastness to severe washing, milling, perspiration, and sulphur stoving, and good fastness to light.

The invention is further illustrated by the dyestuffs listed in the following table:

in which R is one of the group consisting of cyclohexyl and methyl cyclohexyl, and A and B each contain at least one substituent from the group consisting of chlorine and bromine.

2. The dyestuffs of claim 1 in which the hydroxy-naphthalene sulfonic acid radical is that of K-acid.

3. The dyestuffs of claim 1 in which the hydroxy-naphthalene sulfonic acid radical is that of H-acid.

4. The dyestuff represented by the formula:

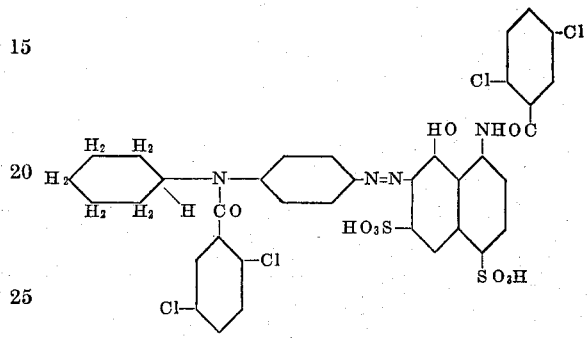

5. The process which comprises coupling diazotized 1-N-benzoyl-R-amino-4-amino-benzene, in which R is one of a group consisting of cyclohexyl and methyl cyclohexyl, and benzoyl has at least one substituent from the class consisting of chlorine and bromine, with 1-N-benzoyl-amino-8-

| Ex. No. | Diazo component, derivative of 1-N-benzoyl-cyclohexyl-amino-4-aminobenzene | Coupling component | Shade given by dyestuff on wool |
|---|---|---|---|
| 9 | 2':5'-dichloro | 3'-chloro-benzoyl-H acid | Crimson-red. |
| 10 | ----do---- | 3'-bromo-benzoyl-H acid | Bluish-red. |
| 11 | ----do---- | 3-bromo-benzoyl-K acid | Red. |
| 12 | 2'-chloro | ----do---- | Bluish-red. |
| 13 | ----do---- | 2-chloro-benzoyl-K acid | Red. |
| 14 | ----do---- | 2':5'-dichloro-benzoyl-K acid | Do. |
| 15 | ----do---- | 2'-chloro-benzoyl-H acid | Bluish-red. |
| 16 | ----do---- | 3'-chloro-benzoyl-H acid | Crimson-red. |
| 17 | Unsubstituted | 2'-chloro-benzoyl-H acid | Bluish-red. |
| 18 | ----do---- | 2':5'-dichloro-benzoyl-H acid | Do. |
| 19 | ----do---- | 2':4'-dichloro-benzoyl-H acid | Do. |
| 20 | 3'-bromo | 2':5'-dichloro-benzoyl-H acid | Do. |
| 21 | ----do---- | Unsubstituted-benzoyl-K acid | Red. |
| 22 | 4'-bromo | ----do---- | Do. |
| 23 | ----do---- | 2'-chloro-benzoyl-K acid | Do. |
| 24 | 3'-chloro | Unsubstituted-benzoyl-H acid | Crimson-red. |
| 25 | ----do---- | Unsubstituted-benzoyl-K acid | Red. |
| 26 | 1-N-benzoyl-(p-methylcyclo-hexyl)-amino-4-aminobenzene | 2':5'-dichloro-benzoyl-K acid | Do. |

I claim:

1. The dyestuff represented by the formula:

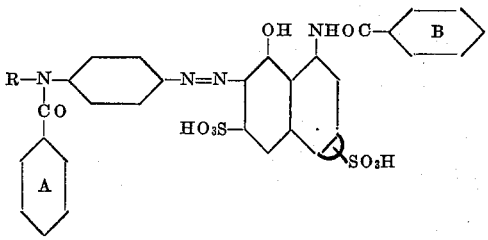

naphthol-disulfonic acid, in which the disulfonic acid is one of the group consisting of the H and the K acid, and in which benzoyl has at least one substituent from the group consisting of chlorine and bromine.

6. Process for the manufacture of a new monoazo red acid dye which comprises coupling diazotised 1-N(2':5'-dichlorobenzoyl)-cyclohexylamino-4-aminobenzene with 1-(2':5'-dichlorobenzoyl)-amino-8-naphthol-4:6-disulphonic acid.

ARTHUR HOWARD KNIGHT.

CERTIFICATE OF CORRECTION.

Patent No. 2,357,958.  September 12, 1944.

ARTHUR HOWARD KNIGHT.

It is hereby certified that error appears in the printed specification of the above numbered patent requiring correction as follows: Page 1, first column, line 21, for "5:6-" read -- 3:6- --; and that the said Letters Patent should be read with this correction therein that the same may conform to the record of the case in the Patent Office.

Signed and sealed this 31st day of October, A. D. 1944.

(Seal)

Leslie Frazer
Acting Commissioner of Patents.